(12) United States Patent
Chen (10) Patent No.: US 8,937,438 B2
(45) Date of Patent: Jan. 20, 2015

(54) POWER SUPPLY WITH RESTART CIRCUIT (75) Inventor: Keng Chen, North Andover, MA (US)

(73) Assignee: Osram Syvlania Inc., Danvers, MA (US)

( * ) Notice: Subject to any disclaimer, the term of this patent is extended or adjusted under 35 U.S.C. 154(b) by 482 days.

(21) Appl. No.: 13/491,060

(22) Filed: Jun. 7, 2012

(65) Prior Publication Data

US 2012/0314463 A1 Dec. 13, 2012

Related U.S. Application Data (60) Provisional application No. 61/495,331, filed on Jun. 9, 2011.

(51) Int. Cl.
H05B 41/16 (2006.01)
(52) U.S. Cl.
USPC ........ 315/247; 315/185 S; 315/291; 315/307; 315/312
(58) Field of Classification Search
USPC ....... 315/224, 247, 225, 185 S, 307–326, 291
See application file for complete search history.

(56) References Cited

U.S. PATENT DOCUMENTS

2002/0033702 A1 3/2002 St-German
2003/0020955 A1* 1/2003 Hitchin ........................ 358/1.18

OTHER PUBLICATIONS

Anton Roider, International Search Report and Written Opinion of the International Searching Authority, Sep. 4, 2012, pp. 1-6, European Patent Office, Rijswijk, The Netherlands.

* cited by examiner

Primary Examiner — Tuyet Thi Vo
(74) Attorney, Agent, or Firm — Shaun P. Montana (57) ABSTRACT A power supply protected against open circuit conditions at its output terminals, and methods for so protecting, are disclosed. A front end circuit receives an input voltage and provides a regulated front end DC voltage to a voltage converter circuit, which in turn provides a DC output voltage to the output terminals to drive a light source. An open circuit protection circuit is coupled between the voltage converter circuit and the output terminals. It has a non-conducting state to couple the DC output voltage to the output terminals, and a conducting state to establish a short circuit across the output terminals in response to charging of a capacitor during an open circuit condition at the output terminals. A restart circuit intermittently discharges the capacitor during the open circuit condition to place the open circuit protection circuit in the non-conducting state when the open circuit condition is resolved.

15 Claims, 4 Drawing Sheets

POWER SUPPLY WITH RESTART CIRCUIT

CROSS-REFERENCE TO RELATED APPLICATION

The present application claims priority of U.S. Provisional Patent Application No. 61/495,331, entitled "LOW POWER CONSUMPTION BUCK REGULATOR CIRCUIT" and filed Jun. 9, 2011, the entire contents of which are hereby incorporated by reference.

TECHNICAL FIELD

The present invention relates to lighting, and more specifically, to power supplies for lighting.

BACKGROUND

Certain power supplies are subject to the safety regulations established by the Underwriters Laboratory (UL). In the United States, the UL1310 Class 2 standard, for example, limits the voltage, current, and power of each output of power supplies classified as Class 2 supplies. In Canada, UL requires that the open circuit voltage in certain power supplies be 42 volts or less for each output channel.

Power supplies often utilize two voltage conversion stages, i.e. a front end stage and an output stage. The front end stage may receive an input voltage, e.g. a 120VAC voltage, and convert the input voltage to a regulated DC output voltage. The output stage may receive the DC output of the front end stage and provide a regulated DC output using a DC/DC converter for each channel of the power supply. When a load is disconnected from a power supply, or when the load fails in a manner that establishes an open circuit, a relatively high voltage may be present at the output of the power supply. This voltage can provide a safety risk. To address this risk it is possible to limit the output voltage of a power supply when the power supply in an open circuit condition (i.e., when the load is removed or fails).

Figure 4:
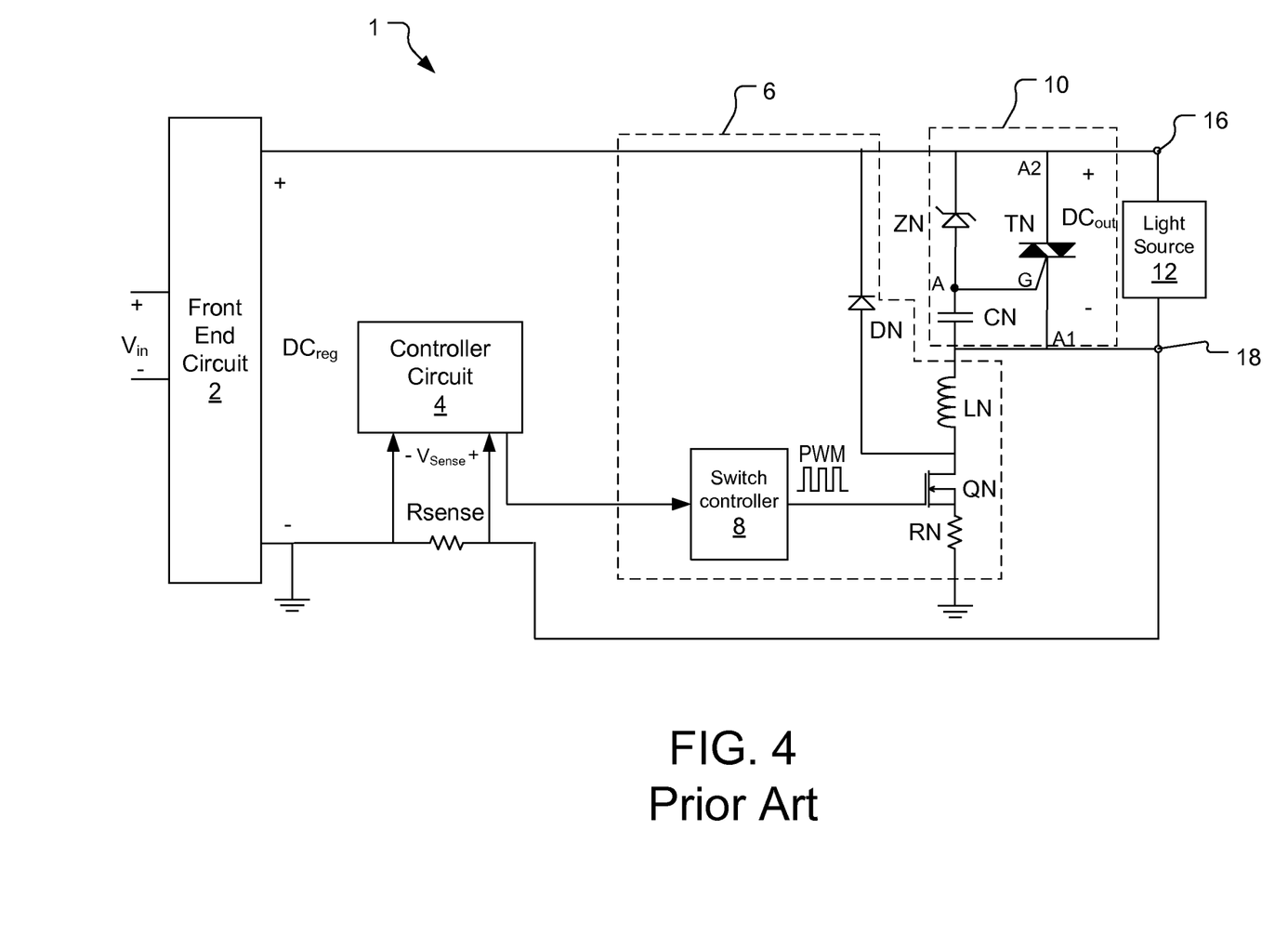
FIG. 4 is a circuit diagram of a prior art power supply circuit.

One known configuration for limiting per-channel open circuit output power and/or voltage of a power supply is illustrated in FIG. 4. The power supply circuit 1 shown in FIG. 4 includes a front end circuit 2, a controller circuit 4, a voltage converter circuit 6 including a switch controller 8, an output voltage protection circuit 10, and a current sense resistor $R_{sense}$. A light source 12 is coupled to output terminals 16, 18 of the power supply circuit 1. The front end circuit 2 receives an input voltage $V_{in}$ and converts the input voltage to a regulated DC output voltage $DC_{reg}$ that is coupled to the voltage converter circuit 6. The voltage converter circuit 6 is configured as a known buck regulator circuit including a metal-oxide field effect transistor (MOSFET) QN which acts as a switch, the switch controller 8, a resistor RN, a diode DN, and an inductor LN. A source of the MOSFET QN is coupled to ground through the resistor RN, and a drain of the MOSFET QN is coupled to the high side of the regulated DC output voltage $DC_{reg}$ through the inductor LN and the parallel combination of the output voltage protection circuit 10 and the light source 12. The diode DN is coupled from the drain of the MOSFET QN to the high side of the regulated DC output voltage $DC_{reg}$, and is reverse biased relative to the high side of the regulated DC output voltage $DC_{reg}$. The switch controller 8 is coupled to a gate of the MOSFET QN for providing a pulse width modulated (PWM) gate drive signal to open and close the MOSFET QN in a known manner.

The controller circuit 4 is configured to provide an output to the switch controller 8 to enable and disable the PWM gate drive output of the switch controller 8 to the MOSFET QN. When the switch controller 8 is enabled by the output of the controller circuit 4, the PWM gate drive signal of the switch controller 8 drives the gate of the switch QN to place the switch QN in alternately conducting ("closed") and non-conducting ("open") states to provide a DC output voltage $DC_{out}$ to the light source 12 in a manner consistent with known buck converter configurations. When the switch controller 8 is disabled by the output of the controller circuit 4, the switch controller 8 places the MOSFET QN in a non-conducting ("open") state, thereby disabling delivery of the DC output voltage $DC_{out}$ to the light source 12.

The output voltage protection circuit 10 includes a triac TN, a zener diode ZN, and a capacitor CN. As is known, a triac, such as the triac TN, conducts current in either direction between its terminals A1 and A2 when a triggering voltage greater than the voltage at the terminal A1 is applied to a gate G of the triac TN. In FIG. 4, the terminals A1 and A2 of the triac TN are coupled in parallel with the light source 12 across the output terminals 16, 18 of the power supply circuit 1. The capacitor CN is coupled between the inductor LN and the gate G of the triac TN at a node A, and the zener diode ZN is coupled between the node A and the high side of the regulated DC output voltage $DC_{reg}$.

In operation, when an open circuit condition occurs at the output terminals 16, 18 of the power supply circuit 1, e.g. upon decoupling of the light source 12 from the output terminals 16, 18 or upon an open circuit failure of the light source 12, the high side of the regulated DC output voltage $DC_{reg}$ charges the capacitor CN through the Zener diode ZN. When the capacitor CN is charged to a voltage exceeding the trigger voltage of the triac TN, the triac TN conducts and establishes a short circuit across the output terminals 16, 18. In addition, when an open circuit occurs at the output terminals 16, 18 of the power supply circuit 1, current through the current sense resistor $R_{sense}$ establishes a voltage $V_{sense}$ at the input to the controller circuit 4 that causes the controller circuit 4 to disable the switch controller 8, thereby preventing delivery of the DC output voltage $DC_{out}$ to the output terminals 16, 18.

SUMMARY

Embodiments of the present invention provide a power supply circuit with restart circuit for use in connection with an open circuit protection circuit. The open circuit protection circuit is coupled between a voltage converter circuit and output terminals of the power supply circuit. The open circuit protection circuit has a non-conducting state to couple the output of the voltage converter circuit to the output terminals and a conducting state to establish a short circuit across the output terminals in response to charging of a capacitor during an open circuit condition at the output terminals. A restart circuit is configured to intermittently discharge the capacitor during the open circuit condition to place the open circuit protection circuit in the non-conducting state when the open circuit condition is resolved. A restart circuit consistent with the present disclosure allows open circuit output voltage protection for a power supply while allowing operation to resume when a light source is reconnected to the power supply output terminals to remove the open circuit condition. This provides size, cost, reliability, and efficiency advantages.

In an embodiment, there is provided a power supply circuit. The power supply circuit includes: a front end circuit configured to receive an input voltage and provide a regulated front end direct current (DC) voltage; a voltage converter circuit configured to receive the regulated front end DC voltage and provide a DC output voltage to output terminals of the power supply circuit to drive a light source; an open circuit protection circuit coupled between the voltage converter circuit and the output terminals, the open circuit protection circuit having a non-conducting state to couple the DC output voltage to the output terminals and a conducting state to establish a short circuit across the output terminals in response to charging of a capacitor during an open circuit condition at the output terminals; and a restart circuit configured to intermittently discharge the capacitor during the open circuit condition to place the open circuit protection circuit in the non-conducting state when the open circuit condition is resolved.

In a related embodiment, the restart circuit may be configured to discharge the capacitor during discharge time periods and to allow the capacitor to charge during charging time periods, and the capacitor may discharge during the discharge time periods to a voltage level above a voltage level required to establish the non-conducing state of the open circuit protection circuit. In a further related embodiment, the capacitor may discharge during the discharge time periods to a voltage level required to establish the non-conducting state in response to resolution of the open circuit condition.

In another related embodiment, the open circuit protection circuit may include a triac having terminals coupled across the output terminals and a gate coupled to the capacitor.

In yet another related embodiment, the power supply circuit may further include: a current sense circuit coupled to the open circuit protection circuit, the current sense circuit being configured to provide a feedback signal representative of current through the open circuit protection circuit; and a controller circuit configured to provide a restart output to cause the restart circuit to intermittently discharge the capacitor in response to the feedback signal. In a further related embodiment, the restart circuit may include at least one transistor, and the restart output may be configured to place the at least one transistor in alternately conducting and non-conducting states to intermittently discharge the capacitor. In another further related embodiment, the voltage converter circuit may include a switch and the controller circuit may be configured to provide an output to place the switch in a non-conducing state so that power is not delivered by the switch to the output terminals during an open circuit condition.

In another embodiment, there is provided a power supply circuit. The power supply circuit includes: a front end circuit configured to receive an input voltage and provide a regulated front end direct current (DC) voltage; a voltage converter circuit configured to receive the regulated front end DC voltage and provide a DC output voltage to output terminals of the power supply circuit to drive a light source; an open circuit protection circuit coupled between the voltage converter circuit and the output terminals and comprising a triac having terminals coupled across the output terminals and a gate coupled to a capacitor, the open circuit protection circuit having a non-conducting state to couple the DC output voltage to the output terminals and a conducting state to establish a short circuit across the output terminals in response to charging of the capacitor during an open circuit condition at the output terminals; a restart circuit configured intermittently discharge the capacitor in discharge time periods and to allow the capacitor to charge during charging time periods, wherein the capacitor discharges during the discharge time periods to a voltage level above a voltage level required to establish the non-conducing state of the open circuit protection circuit; a current sense circuit coupled to the open circuit protection circuit, the current sense circuit being configured to provide a feedback signal representative of current through the open circuit protection circuit; and a controller circuit configured to provide a restart output to cause the restart circuit to intermittently discharge and charge the capacitor in response to the feedback signal.

In a related embodiment, the capacitor may discharge to a voltage level required to establish the non-conducting state in response to resolution of the open circuit condition. In another related embodiment, the restart circuit may include at least one transistor, and the restart output may be configured to place the at least one transistor in alternately conducting and non-conducting states to intermittently discharge the capacitor. In still another related embodiment, the voltage converter circuit may include a switch and the controller circuit may be configured to provide an output to place the switch in a non-conducing state so that power is not delivered by the switch to the output terminals during an open circuit condition.

In another embodiment, there is provided a method of protecting against an open circuit condition in a power supply. The method includes: establishing a short circuit across output terminals of the power supply in response to charging of a capacitor during an open circuit condition at the output terminals; discharging the capacitor during discharge time periods and allowing the capacitor to charge during charging time periods during the open circuit condition; and removing the short circuit across the output terminals of the power supply in response to discharging of the capacitor when the open circuit condition is resolved.

In a related embodiment, establishing a short circuit may include placing a triac in a conducting state in response to charging of the capacitor. In another related embodiment, discharging may include intermittently changing a conductive state of a transistor coupled to the capacitor during the open circuit condition. In yet another related embodiment, discharging may occur in response to a restart signal provided by a controller circuit in response to a feedback signal.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
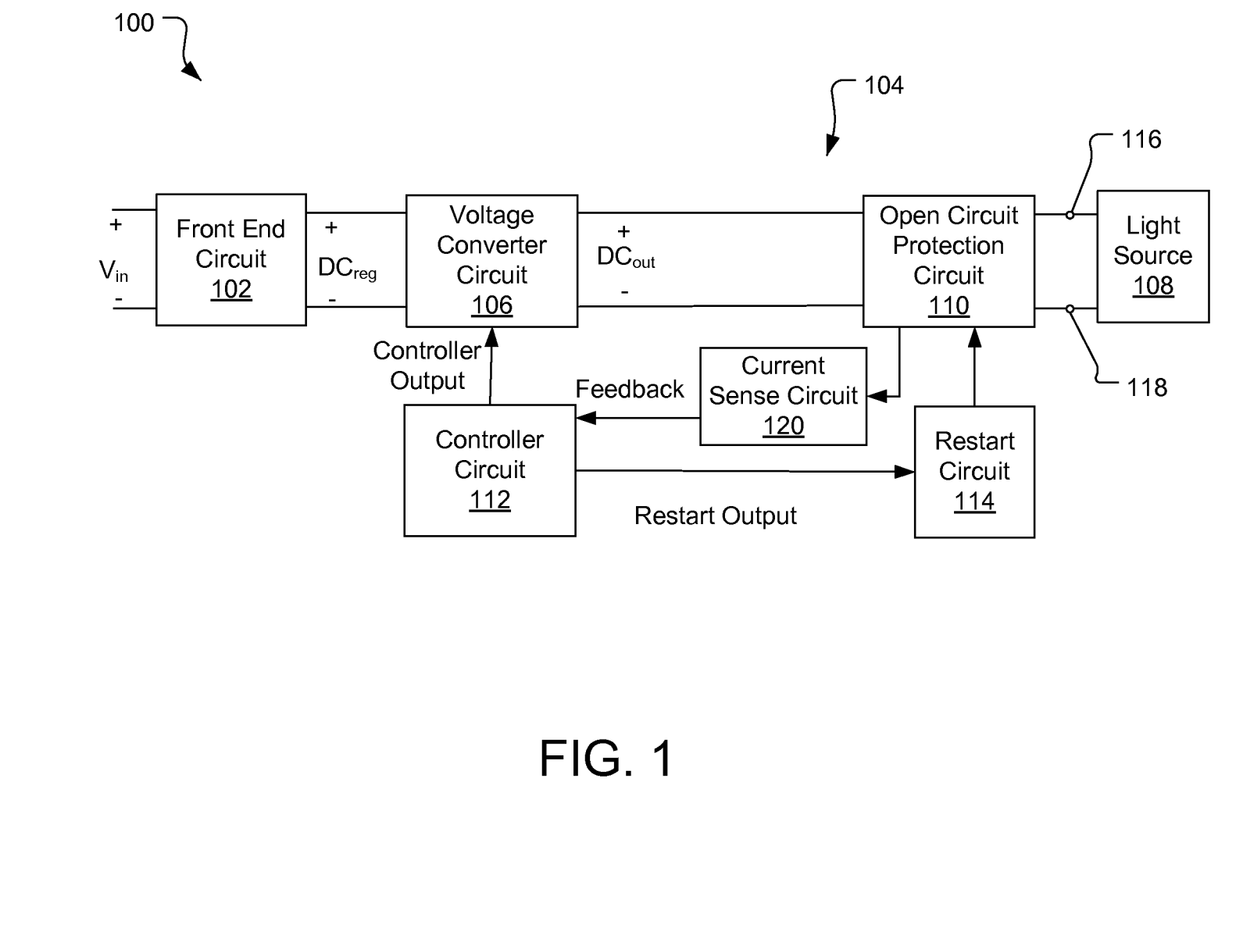
FIG. 1 shows a block diagram of a power supply circuit according to embodiments disclosed herein.

FIG. 1 shows a simplified block diagram of a power supply circuit 100 (also referred to herein as a "power supply"). For ease of explanation, embodiments herein will be described in connection with a power supply circuit that has a single channel (output) for driving a single associated light source. It is to be understood, however, that embodiments may be incorporated into a multi-channel power supply having a plurality of separate channels to provide protection for one or more of the power supply channels.

The power supply circuit 100 includes a known front end circuit 102 and an output stage 104. The output stage 104 includes a voltage converter circuit 106, an open circuit protection circuit 110, a controller circuit 112, a restart circuit 114, and a current sense circuit 120. The power supply circuit 100 may be, and in some embodiments is, configured to drive a light source 108 coupled to output terminals 116, 118 of the power supply circuit 100.

In general, the front end circuit 102 receives an input voltage $V_{in}$ and provides a regulated DC output $DC_{reg}$ to the voltage converter circuit 106. The voltage converter circuit 106 provides a DC output $DC_{out}$ for driving the light source 108 in response to a controller output of the controller circuit 112. The open circuit protection circuit 110 is coupled between the voltage converter circuit 106 and the output terminals 116, 118 and establishes a short circuit across the output terminals 116, 118 of the power supply circuit 100 upon occurrence of an open circuit condition at the output terminals 116, 118. The current sense circuit 120 is coupled to the open circuit protection circuit 110 and provides a feedback signal to the controller circuit 112. In response to the feedback signal, the controller circuit 112 may provide a controller output to the voltage converter circuit 106 to disable delivery of power from the voltage converter circuit 110. The controller circuit 112 also provides a restart output to the restart circuit 114 for allowing the open circuit protection circuit 110 to drive a light source 108 after the open circuit condition is resolved. As used herein, an "open circuit condition" at the output terminals 116, 118 of the power supply circuit 110 occurs when the light source 108 is decoupled from the output terminals 116, 118 or when the light source 108 fails in a state that establishes an open circuit between the output terminals 116, 118 of the power supply circuit 100.

The front end circuit 102 may, and in some embodiments does, include known circuit configurations for receiving the input voltage $V_{in}$, either directly or through a known dimmer circuit (not shown), and providing the regulated direct current (DC) output $DC_{reg}$ to the voltage converter circuit 106. In some embodiments, for example, the input voltage $V_{in}$ may be an alternating current (AC) input provided directly from a 120VAC/60 Hz line source. It is to be understood, however, that a system according to embodiments described herein may operate from a DC source or other AC sources, such as but not limited to a source providing 220-240 VAC at 50-60 Hz. For example, the front end circuit 102 may incorporate a known rectifier circuit for receiving the input voltage $V_{in}$, a known switching converter circuit, and a controller for controlling a switch within the switching converter circuit (not shown in FIG. 1). A variety of rectifier circuit configurations are well-known in the art. In some embodiments, for example, the rectifier circuit may include a known diode bridge rectifier or H-bridge rectifier. The switching converter circuit may receive the rectified AC output from the rectifier and provide the stable, regulated DC output $DC_{reg}$ to the voltage converter circuit 106. A variety of switching converter configurations, including, for example, buck converters, boost converters, buck-boost converters, etc., are well-known in the art. These devices generally include a switch, e.g. a transistor, which is selectively operated to allow energy to be stored in an energy storage device, e.g. an inductor, and then transferred to a load, such as a light source, e.g. using one or more filter capacitors. Another known type of switching converter includes a known transformer-based switching converter, such as a "flyback" converter. In a transformer-based switching converter, the primary side of the transformer may be coupled to the rectified AC output of the rectifier. The regulated DC output voltage is provided at the secondary side of the transformer, which is electrically isolated from the primary side of the transformer.

A variety of controllers for controlling the switch of a switching converter are well-known. In embodiments wherein the switching converter configuration is a buck converter, for example, the controller may be a model number TPS40050 controller presently available from Texas Instruments Corporation of Dallas, Tex., USA. The switching converter circuit may also include a known power factor correction (PFC) circuit.

The voltage converter circuit 106 may include a known switching converter circuit. The switching converter circuit may include a switch, as described above. The switching converter circuit may include a known controller for controlling one or more switches. The voltage converter circuit 106 may receive the regulated DC output $DC_{reg}$ of the front end circuit 102 and provide the DC output $DC_{out}$ to the open circuit protection circuit 110. In the absence of an open circuit condition at the output terminals 116, 118 of the power supply, the DC output $DC_{out}$ is coupled to the light source 108 to deliver power to the light source 108. The light source 108 may be any type of known light source and/or sources and/or combinations thereof, such as but not limited to incandescent lamps, gas discharge lamps, or solid state light sources. If the light source 108 is a solid state light source, it may include groups of solid state light sources (e.g., LED(s)) interconnected in series and/or parallel configurations, and/or combinations thereof.

The open circuit protection circuit 110 is coupled between the voltage converter circuit 106 and the output terminals 116, 118 and may be any component or group of components having a conducting or "closed" state and a non-conducting or "open" state that is controlled by charging of a capacitor. When the open circuit protection circuit 110 is in a conducting or "closed" state, a short circuit is established across the output terminals 116, 118 of the power supply circuit 100, and when the open circuit protection circuit 110 is in a non-conducting or "open" state, the output $DC_{out}$ of the voltage converter circuit 106 is coupled to the output terminals 116, 118 of the power supply circuit 110 for driving the light source 108. In some embodiments, for example, the open circuit protection circuit 110 may include a triac device coupled in parallel with the output terminals 116, 118 and having a gate coupled to the capacitor. In the absence of an open circuit condition, the triac may be in a non-conducting state (with little or no current flowing therethrough), so that the DC output $DC_{out}$ of the voltage converter circuit 106 is coupled across the output terminals 116, 118 for driving the light source 108. Upon occurrence of an open circuit condition, the capacitor may be configured to charge to a voltage above a trigger voltage of the triac to place the triac in a conducting state. When the triac is in a conducting state, a short circuit may be established across the output terminals 116, 118 of the power supply circuit 100.

The current sense circuit 120 may be any component or group of components coupled to the open circuit protection circuit 110 for providing a feedback signal representative of current through the open circuit protection circuit 110. In some embodiments, for example, the current sense circuit may be a sense resistor and the feedback signal may be a voltage across the sense resistor. The controller circuit 112 may be configured to disable delivery of the DC output $DC_{out}$ from the voltage converter circuit 106 in response to the feedback signal. In some embodiments, for example, when the feedback signal exceeds a predefined threshold, the controller circuit 112 provides an output to the voltage converter circuit 106 to disable delivery of the DC output $DC_{out}$ to the open circuit protection circuit 110. The controller circuit 112 may be any type of circuit configured to provide an output for enabling or disabling delivery of the DC output $DC_{out}$ from the voltage converter circuit 106 in response to the feedback signal from the current sense circuit 112. For example, the controller circuit 112 may be a microcontroller configured to enable or disable delivery of the DC output $DC_{out}$ when the feedback signal exceeds a predetermined threshold.

In embodiments wherein the voltage converter circuit 106 is configured as a switching converter including a switch, the controller circuit 112 may be configured to provide an output to the voltage converter circuit 106 for placing the switch therein in a non-conducting or "open" state, whereby no power is provided to the open circuit protection circuit 110. For example, the controller circuit 112 may be configured to disable the gate drive of a transistor switch of a switching converter in the voltage converter circuit 106, to thereby turn the switching converter off, so that no power is supplied to open circuit protection circuit 110.

It has been found that upon occurrence of an open circuit condition, the capacitor in the open circuit protection circuit 110 may maintain a charge that holds the open circuit protection circuit 110 in a conducting state even after the open circuit condition is resolved. When the open circuit protection circuit 110 is held in a conducting state, operation of the power supply circuit 100 for driving the light source 108 cannot resume, since a short circuit is maintained across the output terminals 116, 118 of the power supply circuit 100. Advantageously, the restart circuit 114 is configured to intermittently discharge the capacitor in the open circuit protection circuit 110 so that the DC output $DC_{out}$ of the voltage converter circuit 106 is coupled to the light source 108 for driving the light source 108 when the open circuit condition is resolved.

In general, upon occurrence of an open circuit condition, the controller circuit 112 provides a restart output to the restart circuit 114 in response to the feedback signal from the current sense circuit 110. In some embodiments, the restart output is provided to the restart circuit 114 during the entire duration of an open circuit condition. In response to the restart signal, the restart circuit 114 is configured to intermittently discharge the capacitor in the open circuit protection circuit 110. In some embodiments, for example, the restart circuit 114 discharges the capacitor in successive discharge time periods (e.g. periodically) to a voltage below a voltage required to maintain a conducting state of the open circuit protection circuit 110 while allowing the capacitor to re-charge to a voltage above a voltage required to maintain a conducting state in the open circuit protection circuit 110 in charging time periods between the discharge periods. The capacitor in the open circuit protection circuit 110 thus successively charges and discharges while an open circuit condition exists at the output terminals 116, 118 of the power supply circuit 100. When the open circuit condition is resolved, the discharging of the capacitor by the restart circuit 114 combined with the forward voltage drop of the light source 108 is sufficient to discharge the capacitor below a voltage required to maintain a conducting state of the open circuit protection circuit 110 so that the open circuit protection circuit 110 returns to a non-conducting state and the DC output $DC_{out}$ is coupled to the light source 108.

Figure 2:
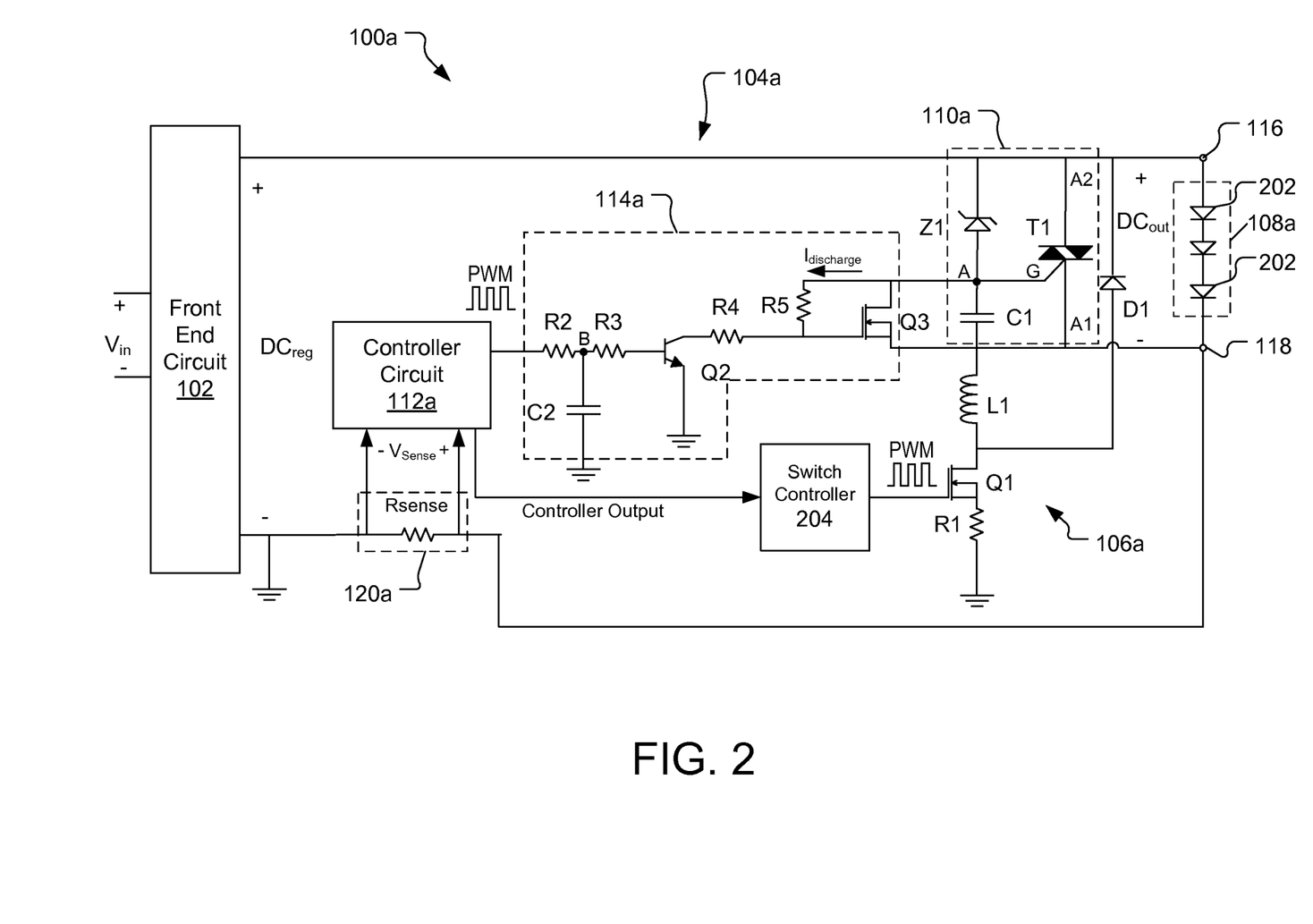
FIG. 2 is a circuit diagram of a power supply circuit according to embodiments disclosed herein.

A power supply according to embodiments described herein may be provided in a variety of configurations. FIG. 2 illustrates a power supply circuit 100a, including a known front end circuit 102 and an output stage 104a. The output stage 104a includes voltage converter circuit 106a, an open circuit protection circuit 110a, a controller circuit 112a, a restart circuit 114a, and a current sense circuit 120a. The power supply circuit 100a may be configured to drive a light source 108a coupled to output terminals 116, 118 of the power supply circuit 100a. In FIG. 2, the light source 108a is configured as a plurality of series connected light emitting diodes 202. It is to be understood, however, that a power supply circuit according to embodiments may be configured for driving any type of light source and/or different types of light sources without departing from the scope of the invention. In embodiments where solid state light sources are incorporated into the light source, e.g. light source 108a, the light source may include any number of solid state light sources coupled in series, parallel, parallel combinations coupled in series, series combinations coupled in parallel, and/or combinations thereof, including a single solid state light source.

In FIG. 2, the front end circuit 102 is a known configuration for receiving the input voltage $V_{in}$ and converting the input voltage to a regulated DC output voltage $DC_{reg}$ that is coupled to the voltage converter circuit 106a. The voltage converter circuit 106a is configured as a known buck regulator circuit including a metal-oxide field effect transistor (MOSFET) Q1 having a source, a gate, and a drain. The MOSFET Q1 acts as a switch. The voltage converter circuit 106a also includes a switch controller 204, a resistor R1, a diode D1, and an inductor L1. The source of the MOSFET Q1 is coupled to ground through the resistor R1, and the drain of the MOSFET Q1 is coupled to the high side of the regulated DC output voltage $DC_{reg}$ through the inductor L1 and the parallel combination of the output voltage protection circuit 110a and the light source 108a. The diode D1 is coupled from the drain of the MOSFET Q1 to the high side of the regulated DC output voltage $DC_{reg}$, and is reverse biased relative to the high side of the regulated DC output voltage $DC_{reg}$. The switch controller 204 is coupled to the gate of the MOSFET Q1 for providing a pulse width modulated (PWM) gate drive signal to open and close the MOSFET Q1 in a known manner.

The controller circuit 112a is configured to provide a controller output to the switch controller 204 to enable and disable the PWM gate drive output of the switch controller 204 to the MOSFET Q1. When the switch controller 204 is enabled by the controller output of the controller circuit 112, the PWM gate drive signal of the switch controller 204 drives the gate of the MOSFET Q1 to place the MOSFET Q1 in alternately conducting ("closed") and non-conducing ("open") states to provide a DC output voltage $DC_{out}$ to the light source 108a in a manner consistent with known buck converter configurations. When the switch controller 204 is disabled by the controller output of the controller circuit 112, the switch controller 204 places the MOSFET Q1 in a non-conducting ("open") state, thereby disabling delivery of the DC output voltage $DC_{out}$ to the light source 108a.

The output voltage protection circuit 110a includes a triac T1, a Zener diode Z1, and a capacitor C1. As is known, a triac, such as the triac T1, conducts current in either direction between its terminals A1 and A2 when a triggering voltage greater than the voltage at the terminal A1 is applied to a gate G of the triac T1. In FIG. 2, the terminals A1 and A2 of the triac T1 are coupled in parallel with the light source 108a across the output terminals 116, 118 of the power supply circuit 100a. The capacitor C1 is coupled between the inductor L1 and the gate G of the triac T1 at a node A, and the Zener diode Z1 is coupled between the node A and the high side of the regulated DC output voltage $DC_{reg}$.

The current sense circuit 120a is configured as a resistor $R_{sense}$ coupled between the terminal A1 of the triac T and ground. Current through the resistor $R_{sense}$ establishes a voltage $V_{sense}$ at the input to the controller circuit 112a. The voltage $V_{sense}$ is a feedback signal provided to the input to the controller circuit 112a and is representative of the current through the open circuit protection circuit 110a.

In the absence of an open circuit condition, the DC output $D_{out}$ is coupled to the output terminals 116, 118 of the power supply circuit 100a across the open circuit protection circuit 110a. When an open circuit condition occurs at the output terminals 116, 118 of the power supply circuit 100a, e.g. upon decoupling of the light source 108a from the output terminals 116, 118 or upon an open circuit failure of the light source 108a, the high side of the regulated DC output voltage $DC_{reg}$ charges the capacitor C1 through the Zener diode Z1. When the capacitor C1 is charged to a voltage exceeding the trigger voltage of the triac T1, the triac T1 conducts and establishes a short circuit across the output terminals 116, 118. In addition, when the triac T1 conducts as a result of an open circuit condition, the current through $R_{sense}$ and the feedback signal $V_{sense}$ increase compared to when an open circuit condition is not present and the triac T1 is in a non-conducting state. When the voltage $V_{sense}$ reaches a predetermined threshold in an open circuit condition, the controller circuit 112 provides the controller output to the switch controller 204, which disables the switch controller 204, thereby reducing power consumption of the power supply circuit 100a during an open circuit condition. Thus, the triac T1 in the open circuit protection circuit 110a has a non-conducting state to couple the DC output voltage $DC_{out}$ to the output terminals 116, 118 and a conducting state to establish a short circuit across the output terminals 116, 118 in response to charging of the capacitor C1 during an open circuit condition. To allow the triac T1 to return to a non-conducting state when the open circuit condition is resolved, the restart circuit 114a intermittently discharges the capacitor C1 during the time period of the open circuit condition. A restart circuit consistent with the present disclosure may be provided in a variety of configurations.

In FIG. 2, the restart circuit 114a includes a bi-polar junction transistor (BJT) Q2, a MOSFET Q3, resistors R2, R3, R4, and R5, and a capacitor C5. The MOSFET Q3 includes a gate, a source, and a drain, and is coupled in parallel with the capacitor C1, with the drain of the MOSFET Q3 coupled to the node A between the capacitor C1 and the Zener diode Z1, and the source of the MOSFET Q3 coupled to the inductor L1. The resistor R5 is coupled between the gate of the MOSFET Q3 and the node A between the capacitor C1 and the Zener diode Z1. The gate of the MOSFET Q3 is also coupled to a drain of the BJT Q2 through the resistor R4. A source of the BJT Q2 is coupled to ground. A gate of the BJT Q2 is coupled to a node B through the resistor R3, with the capacitor C2 coupled between the node B and ground. The restart output of the controller circuit 112a is coupled to the node B through the resistor R2 and is provided during the time period of an open circuit condition in response to the feedback signal $V_{sense}$.

In FIG. 2, the restart output is a pulse width modulated (PWM) signal (hereinafter also referred to as "PWM restart output"). In some embodiments, for example, the PWM restart output may have a pulse width of about 10 ms. In response to the restart output being provided, the resistors R2 and R3 and the capacitor C2 establish a saw tooth wave at the gate of the BJT Q2, which places the BJT Q2 in alternately conducting ("closed") and non-conducting ("open") states. When the BJT Q2 is in a conducting state, i.e. during a discharge time period, the capacitor C1 discharges with a discharge current $I_{discharge}$ flowing through the resistor R5, the resistor R4, and the BJT Q2 to ground. When the BJT Q2 is in a non-conducting state, i.e. during a charging time period, current associated with the regulated DC output $DC_{reg}$ charges the capacitor C1 back to a level above the trigger voltage of the triac T1.

During the discharge time period, the capacitor C1 is allowed to discharge to a voltage level that is above the trigger voltage of the triac T1 so that the triac T1 remains in a conducting state. However, when the open circuit condition is resolved, the capacitor C1 further discharges through the light source 108a to a level below the trigger voltage of the triac T1 causing the triac T1 to enter a non-conducting state. When the triac T1 is in a non-conducting state, the current through $R_{sense}$ decreases to establish a feedback signal $V_{sense}$ that is below the predetermined threshold. In response to this decrease in the voltage $V_{sense}$, the controller circuit 112a establishes a controller output to enable the switch controller 204, thereby causing the voltage converter circuit 106a to deliver the output voltage $DC_{out}$ to the light source 108a for driving the light source 108a. Advantageously, therefore, the power supply circuit 100a provides protection against an open circuit condition and the restart circuit 114a allows the power supply circuit 100a to resume delivery of power to the light source 108a when an open circuit condition is resolved.

Figure 3:
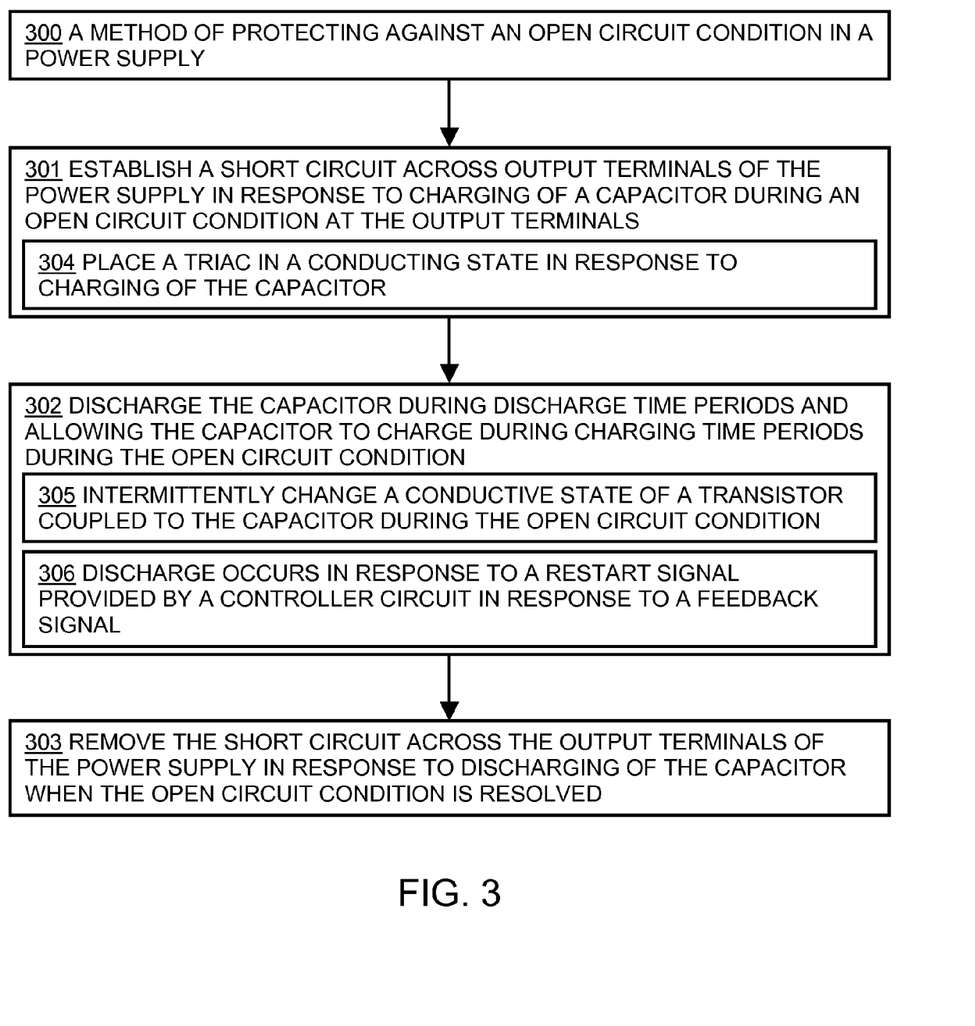
FIG. 3 is a block flow diagram of a method according to embodiments disclosed herein.

FIG. 3 is a block flow diagram of a method 300 of protecting against an open circuit condition in a power supply, such as the power supply circuits 100 and 100a shown in FIGS. 1 and 2 according to embodiments described herein. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

In the method 300, a short circuit is established across output terminals of the power supply in response to charging of a capacitor during an open circuit condition at the output terminals, step 301. The capacitor is discharged during discharge time periods and the capacitor is allowed to charge during charging time periods during the open circuit condition, step 302. The short circuit across the output terminals of the power supply is then removed, step 303, in response to discharging of the capacitor when the open circuit condition is resolved. In some embodiments, establishing a short circuit includes placing a triac in a conducting state in response to charging of the capacitor, step 304. In some embodiments, discharging includes intermittently changing a conductive state of a transistor coupled to the capacitor during the open circuit condition, step 305, and alternatively or additionally, discharging occurs in response to a restart signal provided by a controller circuit in response to a feedback signal, step 306.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following:

Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A power supply circuit comprising:
   a front end circuit configured to receive an input voltage and provide a regulated front end direct current (DC) voltage;
   a voltage converter circuit configured to receive the regulated front end DC voltage and provide a DC output voltage to output terminals of the power supply circuit to drive a light source;
   an open circuit protection circuit coupled between the voltage converter circuit and the output terminals, the open circuit protection circuit having a non-conducting state to couple the DC output voltage to the output terminals and a conducting state to establish a short circuit across the output terminals in response to charging of a capacitor during an open circuit condition at the output terminals; and
   a restart circuit configured to intermittently discharge the capacitor during the open circuit condition to place the open circuit protection circuit in the non-conducting state when the open circuit condition is resolved.

2. The power supply circuit of claim 1, wherein the restart circuit is configured to discharge the capacitor during discharge time periods and to allow the capacitor to charge during charging time periods, and wherein the capacitor discharges during the discharge time periods to a voltage level above a voltage level required to establish the non-conducing state of the open circuit protection circuit.

3. The power supply circuit of claim 2, wherein the capacitor discharges during the discharge time periods to a voltage level required to establish the non-conducting state in response to resolution of the open circuit condition.

4. The power supply circuit of claim 1, wherein the open circuit protection circuit comprises a triac having terminals coupled across the output terminals and a gate coupled to the capacitor.

5. The power supply circuit of claim 1, further comprising:
a current sense circuit coupled to the open circuit protection circuit, the current sense circuit being configured to provide a feedback signal representative of current through the open circuit protection circuit; and
a controller circuit configured to provide a restart output to cause the restart circuit to intermittently discharge the capacitor in response to the feedback signal.

6. The power supply circuit of claim 5, wherein the restart circuit comprises at least one transistor, and wherein the restart output is configured to place the at least one transistor in alternately conducting and non-conducting states to intermittently discharge the capacitor.

7. The light source power supply circuit of claim 5, wherein the voltage converter circuit comprises a switch and wherein the controller circuit is configured to provide an output to place the switch in a non-conducing state so that power is not delivered by the switch to the output terminals during an open circuit condition.

8. A power supply circuit comprising:
a front end circuit configured to receive an input voltage and provide a regulated front end direct current (DC) voltage;
a voltage converter circuit configured to receive the regulated front end DC voltage and provide a DC output voltage to output terminals of the power supply circuit to drive a light source;
an open circuit protection circuit coupled between the voltage converter circuit and the output terminals and comprising a triac having terminals coupled across the output terminals and a gate coupled to a capacitor, the open circuit protection circuit having a non-conducting state to couple the DC output voltage to the output terminals and a conducting state to establish a short circuit across the output terminals in response to charging of the capacitor during an open circuit condition at the output terminals;
a restart circuit configured intermittently discharge the capacitor in discharge time periods and to allow the capacitor to charge during charging time periods, wherein the capacitor discharges during the discharge time periods to a voltage level above a voltage level required to establish the non-conducing state of the open circuit protection circuit;
a current sense circuit coupled to the open circuit protection circuit, the current sense circuit being configured to provide a feedback signal representative of current through the open circuit protection circuit; and
a controller circuit configured to provide a restart output to cause the restart circuit to intermittently discharge and charge the capacitor in response to the feedback signal.

9. The power supply circuit of claim 8, wherein the capacitor discharges to a voltage level required to establish the non-conducting state in response to resolution of the open circuit condition.

10. The light source power supply circuit of claim 8, wherein the restart circuit comprises at least one transistor, and wherein the restart output is configured to place the at least one transistor in alternately conducting and non-conducting states to intermittently discharge the capacitor.

11. The light source power supply circuit of claim 8, wherein the voltage converter circuit comprises a switch and wherein the controller circuit is configured to provide an output to place the switch in a non-conducing state so that power is not delivered by the switch to the output terminals during an open circuit condition.

12. A method of protecting against an open circuit condition in a power supply, comprising:
establishing a short circuit across output terminals of the power supply in response to charging of a capacitor during an open circuit condition at the output terminals;
discharging the capacitor during discharge time periods and allowing the capacitor to charge during charging time periods during the open circuit condition; and
removing the short circuit across the output terminals of the power supply in response to discharging of the capacitor when the open circuit condition is resolved.

13. The method of claim 12, wherein establishing a short circuit comprises placing a triac in a conducting state in response to charging of the capacitor.

14. The method of claim 12, wherein discharging comprises intermittently changing a conductive state of a transistor coupled to the capacitor during the open circuit condition.

15. The method of claim 12, wherein discharging occurs in response to a restart signal provided by a controller circuit in response to a feedback signal.

* * * * *